US009217077B2

(12) United States Patent
Torbruegge et al.

(10) Patent No.: US 9,217,077 B2
(45) Date of Patent: Dec. 22, 2015

(54) SULFUR-CROSSLINKABLE RUBBERIZING MIXTURE

(71) Applicant: Continental Reifen Deutschland GmbH, Hannover (DE)

(72) Inventors: Thorsten Torbruegge, Langenhagen (DE); Marc Kreye, Braunschweig (DE); Thomas Kramer, Herford (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/185,621

(22) Filed: Feb. 20, 2014

(65) Prior Publication Data

US 2014/0171564 A1 Jun. 19, 2014

Related U.S. Application Data

(63) Continuation of application No. PCT/EP2012/065087, filed on Aug. 2, 2012.

(30) Foreign Application Priority Data

Sep. 9, 2011 (DE) ........................ 10 2011 053 452

(51) Int. Cl.

*C08L 7/00* (2006.01)
*C08K 3/04* (2006.01)
*B60C 1/00* (2006.01)

(52) U.S. Cl.

CPC ................. *C08L 7/00* (2013.01); *B60C 1/0041* (2013.04); *C08K 3/04* (2013.01); *B60C 2001/0066* (2013.04); *B60C 2009/0021* (2013.04); *C08K 2201/006* (2013.01); *C08K 2201/011* (2013.01); *Y02T 10/862* (2013.01)

(58) Field of Classification Search

CPC ............. C08L 7/00; B60C 1/00; B60C 13/00; C08K 3/34; C08K 5/541; C07F 7/08; C08F 136/06

USPC ......................................... 524/184, 396, 398

See application file for complete search history.

(56) References Cited

U.S. PATENT DOCUMENTS

| | | | | |
|---|---|---|---|---|
| 5,871,597 | A | 2/1999 | Vasseur | |
| 6,169,137 | B1 | 1/2001 | Vasseur | |
| 7,307,116 | B2 | 12/2007 | Mizuno et al. | |
| 7,789,119 | B2 | 9/2010 | Agostini et al. | |
| 8,053,510 | B2 | 11/2011 | Sandstrom et al. | |
| 8,426,512 | B2 | 4/2013 | Zhang et al. | |
| 8,936,056 | B2 | 1/2015 | Arnold et al. | |
| 2014/0155544 | A1 * | 6/2014 | Du et al. | 524/575.5 |

FOREIGN PATENT DOCUMENTS

| | | | | |
|---|---|---|---|---|
| EP | 0 754 735 A2 | | 1/1997 | |
| EP | 0 949 303 A1 | | 10/1999 | |
| EP | 1 983 021 A1 | | 10/2008 | |
| WO | WO 99/09036 | * | 2/1999 | C07F 7/18 |

OTHER PUBLICATIONS

Neidermeier et al., Nano-Structure Blacks, Datta et al., KGK Kautschuk Gummi Kunststoffe 52, Jahrgang, No. 10/99, pp. 670-676, 1999.*

International Search Report dated Sep. 4, 2012 of international application PCT/EP2012/065087 on which this application is based.

Datta R. et al, "Steel Cord Adhesion", KGK Kautschuk Gummi Kunststoffe 52, Jahrgang, No. 5/99, pp. 322 to 328, 1999.

Eisele, U. et al, "The Tear Analyzer—A New Tool for Quantitative Measurements of the Dynamic Crack Growth of Elastomers", Kautschuk + Gummi-Kunststoffe 45, Jahrgang, Nr. 12/92, pp. 1064 to 1069, 1992.

Neidermeier, W. et al, "Nano-Structure Blacks", KGK Kautschuk Gummi Kunststoffe 52, Jahrgang, No. 10/99, pp. 670 to 676, 1999.

Singh, B. et al, "Neue Haftvermittler aus vinylterminierten Carbamylmethyl-Melaminharzen", GAK 5, 1995—Jahrgang 48, pp. 536 to 541, 1995.

Zhong, X., "Progess of Carbon Black Production Technology and New Product Development", World Rubber Industry, 55, vol. 32, Issue 2, Feb. 28, 2005, pp. 45 to 49, in Chinese and English translation.

English translation of the Office action of the Chinese Patent Office dated Jan. 12, 2015 in the corresponding Chinese patent application 201280043443.8.

* cited by examiner

*Primary Examiner* — Robert Harlan

(74) *Attorney, Agent, or Firm* — Walter Ottesen P.A.

(57) ABSTRACT

A sulfur-crosslinkable rubberizing mixture for strengthening elements in motor vehicle pneumatic tires comprises 70 to 100 phr (parts by weight, based on 100 parts by weight of total rubbers in the mixture) of natural rubber, up to 30 phr of at least one polybutadiene, 40 to 70 phr of at least one carbon black and a bonding system. Further, motor vehicle pneumatic tires are disclosed that comprise the sulfur-crosslinked rubberizing mixture. The key conflict between tear propagation resistance, stiffness and heat build-up is solved by virtue of the carbon black being a nanostructured carbon black with a rough surface.

12 Claims, No Drawings

SULFUR-CROSSLINKABLE RUBBERIZING MIXTURE

CROSS REFERENCE TO RELATED APPLICATIONS

This application is a continuation application of international patent application PCT/EP2012/065087, filed Aug. 2, 2012, designating the United States and claiming priority from German application 10 2011 053 452.0, filed Sep. 9, 2011, and the entire content of both applications is incorporated herein by reference.

FIELD OF THE INVENTION

The invention relates to a sulfur-crosslinkable rubberizing mixture for reinforcement in pneumatic tires, comprising from 70 to 100 phr (parts by weight, based on 100 parts by weight of all of the rubbers in the mixture) of natural rubber, up to 30 phr of at least one polybutadiene, from 40 to 70 phr of at least one carbon black, and an adhesive system. The invention further relates to pneumatic tires which comprise the sulfur-crosslinked rubberizing mixture.

BACKGROUND OF THE INVENTION

The phr (parts per hundred parts of rubber by weight) data used in this specification are the conventional quantitative data used in the rubber industry for mixture formulations. The amount added in parts by weight of the individual substances here is always based on 100 parts by weight of the entire composition of all of the rubbers present in the mixture.

Pneumatic tires are strengthened by textile or metallic reinforcement, e.g., brass-coated steel cord, in order to withstand high mechanical stresses. Pneumatic tires comprise by way of example brass-coated steel cord in the belt, in the bead core, and optionally in the carcass. In order to ensure that the rubber-reinforcement composite is durable, the embedding rubber mixture (rubberizing mixture) is intended to exhibit good adhesion to the reinforcement, and this adhesion should not be impaired by aging and by storage in moist conditions. The vulcanizates should moreover exhibit high dynamic and mechanical strength and low susceptibility to cracking and to crack propagation.

The adhesion of rubber to textile reinforcement is achieved by way of impregnation (e.g. with resorcinol-formaldehyde resins in combination with rubber latices (RFL dip)) by the direct method using adhesive mixtures or by way of adhesive solutions of unvulcanized rubber using polyisocyanates.

The rubber-metal adhesion can be advantageously influenced by use of what are known as reinforcing resins in the rubberizing mixture. Examples of known reinforcing resins are lignin, polymer resins, and phenol-formaldehyde resins with hardener. A method that has long been known for improving the rubber-metal adhesion is to use cobalt salts and/or a resorcinol-formaldehyde-silica system, or a resorcinol-formaldehyde system as additions for the rubberizing mixtures. Rubberizing mixtures with cobalt salts and with a resorcinol-formaldehyde-silica system are known by way of example from KGK Kautschuk Gummi Kunststoffe No. 5/99, pp. 322 to 328, from GAK August 1995, p. 536, and from U.S. Pat. No. 7,307,116.

Fillers used in known rubberizing mixtures are carbon black and/or silica in the following carbon-black-to-silica ratios: from 100:0 to 80:20, or else from 20:80 to 0:100.

Sulfur-crosslinkable rubberizing mixtures are known from U.S. Pat. Nos. 5,871,597 and 6,169,137 (see comparative experiments). In those documents they are used by way of example as rubberizing mixtures for the belt. The carbon blacks used in U.S. Pat. No. 5,871,597 and U.S. Pat. No. 6,169,137 are those of type N326. Along with type N330, this is one of the typical carbon blacks for rubberizing mixtures.

SUMMARY OF THE INVENTION

The present invention is based on the object of providing rubberizing mixtures which can be used for reinforcement in pneumatic tires and which have been improved in respect of the conflicting objectives of tear-propagation resistance, stiffness, and temperature increase. The intention is thus to improve the lifetime of pneumatic tires.

The invention achieves the object in that the carbon black is a nanostructured carbon black with rough surface.

Surprisingly, it has been found that use of carbon blacks of this type can reduce the hysteresis of rubberizing mixtures, thus leading to reduced temperature increase, and at the same time can improve tear-propagation resistance. Tires using a rubberizing mixture of the invention by way of example as rubberizing mixture for the belt thus obtain a markedly increased lifetime.

Nanostructured carbon blacks with rough surface are known by way of example from EP 0 949 303 B1, from EP 0 754 735 A2, or from Kautschuk Gummi Kunstoffe 52(10), 670 (1999). They are used in tire-tread mixtures based on SBR and BR in order to reduce rolling resistance and abrasion. Mixtures based on SBR and BR have inadequate tear-propagation resistance. Nanostructured carbon blacks of this type with rough surface are marketed by way of example as Ecorax® by Evonik Industries.

The rubberizing mixture of the invention comprises from 40 to 70 phr of at least one nanostructured carbon black with rough surface. However, the rubberizing mixture can also comprise a plurality of carbon blacks of this type in a mixture.

The nanostructured carbon black preferably features an oil absorption number OAN in accordance with ASTM D2414 of ≥135 mL/100 g, a specific surface area STSA accessible for rubber in accordance with ASTM D6556 of ≥80 $m^2/g$, and an iodine adsorption number in accordance with ASTM D1510 of ≥90 mg/g, where the ratio of OAN to STSA is >1.1, preferably >1.3. Among the carbon blacks are by way of example the Ecorax® grades 1670 and 1720 from Evonik Industries.

The rubberizing mixture comprises from 70 to 100 phr of natural rubber (NR), this being a polyisoprene synthesized biochemically in plants with more than 99% cis-1,4 content. For particularly good tear-propagation resistance values, the rubberizing mixture preferably comprises 100 phr of natural rubber.

The rubberizing mixture may comprise, as further rubber, up to 30 phr, preferably from 15 to 25 phr, of at least one polybutadiene (BR). For particularly good adhesion properties and good processing behavior, the polybutadiene is one having more than 95% by weight cis content or a functionalized Li-polybutadiene, e.g. BR1250 H from Nippon Zeon or functionalized polybutadienes of the type described in U.S. Pat. No. 8,426,512.

In order to achieve a further improvement in tear-propagation resistance at low hysteresis, it has proven advantageous for the rubberizing mixture to comprise from 40 to 60 phr of the at least one nanostructured carbon black.

In order to achieve a further improvement in the ultimate tensile properties of the rubberizing mixture, the mixture comprises from 2 to 15 phr of at least one pale-colored filler. The filler can be chalk or aluminosilicate. However, it is preferable to use silica as pale-colored filler. This is generally used without silane coupling agents, i.e., in the form of what is known as inert filler.

The rubberizing mixture of the invention comprises an adhesive system. Use of either an adhesive system for rubber-textile adhesion or an adhesive system for rubber-metal adhesion depends on whether the rubber mixture is to be used for textile or metallic reinforcement.

In a preferred embodiment of the invention, the reinforcement is metallic reinforcement. The improvement of adhesion and of cracking behavior has a particularly advantageous effect in the case of metallic reinforcement because, in the event of loss of adhesion and of cracking, the metallic reinforcement has increased exposure to corrosion, with resultant severe impairment of the lifetime of the pneumatic tire.

If the rubberizing mixture is used for rubberizing metallic reinforcement, in particular steel cord, it is preferable to use a steel cord adhesion system based on organic cobalt salts and on reinforcing resins, and more than 2.5 phr of sulfur.

The amounts used of the organic cobalt salts are usually from 0.2 to 2 phr. Examples of cobalt salts that can be used are cobalt stearate, borate, borate alkanoates, naphthenate, rhodinate, octanoate, adipate, etc. Reinforcing resins that can be used are resorcinol-formaldehyde resins, such as resorcinol-hexamethoxymethylmelamine resins (HMMM), or resorcinol-hexamethylenetetramine resins (HEXA), or modified phenolic resins, for example Alnovol® products. It is also possible to use the precondensates of the resorcinol resins.

The rubber mixture can comprise, as other additions, conventional parts by weight of other conventional additional substances, for example processing aids, vulcanization accelerators, vulcanization retarders, zinc oxide, and antioxidants.

The production of the rubberizing mixture of the invention is achieved conventionally, by first generally producing a parent mixture which comprises all of the constituents except for the vulcanization system (sulfur and substances affecting vulcanization) in one or more mixing stages, and then producing the finished mixture by adding the vulcanization system. The mixture is then further processed.

The rubberizing mixture can be used for rubberizing a very wide variety of tire components, for example the bead core, the bead coverings, the belt, the carcass, or the bracing bandages, and it is also possible here that a plurality of components within a tire are provided, i.e., generally calendered, with the mixture of the invention.

A particularly long extension of the lifetime of pneumatic tires can be achieved when the rubberizing mixture of the invention is provided to the generally metallic bracing plies. A tire which has a belt with the mixture of the invention as belt rubber mix and which is constructed and vulcanized by conventional processes features very good belt durability.

As an alternative or in parallel with this, the rubberizing mixture can be provided to a carcass. It is preferable that this is the steel cord carcass of a tire for a commercial vehicle.

DESCRIPTION OF THE PREFERRED EMBODIMENTS OF THE INVENTION

The invention will now be explained in more detail with reference to comparative examples and to inventive examples, these being summarized in Table 1.

In all of the mixture examples in the tables, the stated quantitative data are parts by weight, based on 100 parts by weight of all rubber (phr). comp denotes the comparative mixtures, and I denotes the rubberizing mixture of the invention. The mixtures comp(1) and comp(2) are rubberizing mixtures which comprise conventional carbon blacks of type N 339 (STSA=88 $m^2/g$, OAN=120 mL/100 g, iodine adsorption number=90 mg/g) and N 326 (STSA=77 $m^2/g$, OAN 72 mL/100 g, iodine adsorption number=82 mg/g). The mixture I comprises, in contrast, a nanostructured carbon black with rough surface (Ecorax® 1670 from Evonik Industries).

The mixture was produced under conventional conditions in a plurality of stages in a laboratory tangential mixer. Test specimens were produced from all of the mixtures via 20 minutes of vulcanization under pressure at 160° C., and properties typical in the rubber industry were determined on the materials by the test methods stated below.

Shore A hardness at room temperature and 70° C. in accordance with DIN 53 505

Rebound resilience at room temperature and 70° C. in accordance with DIN 53 512

Tensile strength at room temperature in accordance with DIN 53 504

Elongation at break at room temperature in accordance with DIN 53 504

Modulus at 50 and 300% elongation at room temperature in accordance with DIN 53 504

Fracture energy density determined in the tensile test in accordance with DIN 53 504, where the fracture energy density is the required fracture energy divided by the volume of the specimen The mixtures were also characterized in relation to their dynamic durability with the aid of a "tear fatigue analyzer" (TFA). Typical test procedures are described by way of example in Kautschuk Gummi Kunststoffe 45 (12), 1064 ff (1992). The present results were achieved with a pulse loading of 30/5 Hz and with dynamic elongations of from 5 to 8%. The evaluation determined the possible energy introduced for a lifetime of 100 kcycles.

385/65 R22.5 commercial-vehicle tires with a four-ply steel belt were moreover produced with the mixtures comp (1), comp(2) and I as rubberizing mixtures for steel cord belt plies, and the durability of the tires was tested at a constant ambient temperature of 38° C. on an in-house test rig. The typical test procedure includes a load increase in stages until the tire fails.

TABLE 1

| | Unit | comp (1) | comp (2) | I |
|---|---|---|---|---|
| Constituents | | | | |
| Natural rubber | phr | 100 | 100 | 100 |
| Carbon black N 339 | phr | 52 | — | — |
| Carbon black N 326 | phr | — | 52 | — |
| Nanostructured carbon black[a] | phr | — | — | 52 |
| Silica | phr | 8 | 8 | 8 |
| Processing aids | phr | 7 | 7 | 7 |
| Antioxidant | phr | 3 | 3 | 3 |
| Organic cobalt salt | phr | 0.65 | 0.65 | 0.65 |
| Resin made of resorcinol and formaldehyde donor | phr | 2.6 | 2.6 | 2.6 |
| Zinc oxide | phr | 8 | 8 | 8 |
| Accelerator | phr | 1.6 | 1.5 | 1.6 |
| Sulfur | phr | 5.5 | 6.9 | 5.5 |
| Properties | | | | |
| Shore A hardness at RT | Shore A | 75 | 74 | 73 |
| Shore A hardness at 70° C. | Shore A | 72 | 71 | 71 |
| Rebound resilience at RT | % | 40 | 44 | 43 |
| Rebound resilience at 70° C. | % | 58 | 58 | 58 |
| Tensile strength at RT | MPa | 22 | 21 | 21 |
| Elongation at break at RT | % | 360 | 366 | 360 |
| 50% modulus | MPa | 2.4 | 2.3 | 2.3 |
| 300% modulus | MPa | 19.7 | 18.4 | 19.0 |
| Fracture energy density | $J/cm^3$ | 33 | 31 | 31 |
| TFA results for 100 kilo-cycles | | | | |

TABLE 1-continued

| | Unit | comp (1) | comp (2) | I |
|---|---|---|---|---|
| Elongation | % | 19.77 | 18.53 | 19.27 |
| Tensile stress | MPa | 1.31 | 1.17 | 1.19 |
| Elastic energy | kPa | 109.44 | 92.12 | 97.69 |
| Diss. Energy | kPa | 46.27 | 39.64 | 36.52 |
| tan δ | — | 0.243 | 0.250 | 0.216 |
| Drum running time to failure | h | 172 | 112 | 199 |

[a]nanostructured carbon black with rough surface, Ecorax ® 1670 from Evonik Industries, STSA = 92 $m^2$/g, OAN = 140 mL/100 g, iodine adsorption number = 100 mg/g It is apparent from the results from the TFA that a lower temperature increase with equal maximum elongation is observed in the case of the inventive mixture, which can be seen from the small value for the tan δ. This leads to improved belt durability. Moreover, inadequate maximum elongations are attained with the carbon black N 326.

The tire tests on a test drum demonstrate the distinct increase in durability resulting from use of the rubberizing mixture of the invention to rubberize the belt.

It is understood that the foregoing description is that of the preferred embodiments of the invention and that various changes and modifications may be made thereto without departing from the spirit and scope of the invention as defined in the appended claims.

What is claimed is:

1. A sulfur-crosslinkable rubberizing mixture for reinforcement in pneumatic tires, the mixture comprising:

from 70 to 100 phr (parts by weight, based on 100 parts by weight of all of the rubbers in the mixture) of natural rubber;

from 0 to 30 phr of at least one polybutadiene;

from 40 to 70 phr of at least one carbon black; and, an adhesive system, wherein the at least one carbon black is a nanostructured carbon black with a specific surface area STSA accessible for rubber in accordance with ASTM D6556 of ≥ 80 $m^2$/g.

2. The rubberizing mixture as claimed in claim 1, wherein the nanostructured carbon black has an oil absorption number OAN in accordance with ASTM D2414 of ≥ 135 mL/100 g and an iodine adsorption number in accordance with ASTM D1510 of ≥90 mg/g, where a ratio of OAN to STSA is >1.1.

3. The rubberizing mixture as claimed in claim 1, comprising 100 phr of natural rubber.

4. The rubberizing mixture as claimed in claim 1, wherein an amount of the at least one carbon black is from 40 to 60 phr.

5. The rubberizing mixture as claimed in claim 1, further comprising from 2 to 15 phr of at least one pale-colored filler.

6. The rubberizing mixture as claimed in claim 1, wherein the reinforcement is a metallic reinforcement.

7. The rubberizing mixture as claimed in claim 6, wherein the adhesive system is a steel cord adhesive system comprising an organic cobalt salt, a reinforcing resin, and more than 2.5 phr of sulfur.

8. A pneumatic tire which comprises a sulfur-crosslinked rubberizing mixture as claimed in claim 1.

9. The pneumatic tire as claimed in claim 8, wherein the rubberizing mixture is a belt-rubber mix.

10. The pneumatic tire as claimed in claim 8, wherein the rubberizing mixture is a carcass-rubber mix.

11. The rubberizing mixture as claimed in claim 2, wherein the ratio of OAN to STSA is >1.3.

12. The pneumatic tire as claimed in claim 10, wherein the pneumatic tire is a tire for a commercial vehicle.

* * * * *